United States Patent
Chennault

(10) Patent No.: US 11,731,893 B2
(45) Date of Patent: Aug. 22, 2023

(54) PHYTOREMEDIATION TREATMENT METHOD USING VETIVER GRASS TO REMOVE AMMONIA FROM RAW SANITARY WASTEWATER

(71) Applicant: Eastwood Environmental, Inc., Huron, OH (US)

(72) Inventor: Derrick O. Chennault, Huron, OH (US)

(73) Assignee: Eastwood Environmental, Inc., Huron, OH (US)

( * ) Notice: Subject to any disclaimer, the term of this patent is extended or adjusted under 35 U.S.C. 154(b) by 87 days.

(21) Appl. No.: 17/504,796

(22) Filed: Oct. 19, 2021

(65) Prior Publication Data

US 2023/0124717 A1 Apr. 20, 2023

(51) Int. Cl.
| | | |
|---|---|---|
| *C02F 3/32* | (2023.01) | |
| *C02F 3/30* | (2023.01) | |
| *A01G 20/00* | (2018.01) | |
| *A01G 31/00* | (2018.01) | |
| *A01G 29/00* | (2006.01) | |
| *C02F 101/16* | (2006.01) | |
| *C02F 101/38* | (2006.01) | |
| *C02F 101/30* | (2006.01) | |

(52) U.S. Cl.
CPC .............. *C02F 3/327* (2013.01); *A01G 20/00* (2018.02); *A01G 31/00* (2013.01); *C02F 3/301* (2013.01); *C02F 3/305* (2013.01); *A01G 29/00* (2013.01); *C02F 2101/16* (2013.01); *C02F 2101/30* (2013.01); *C02F 2101/38* (2013.01)

(58) Field of Classification Search
CPC .......... C02F 3/327; C02F 3/301; C02F 3/305; C02F 2101/16; C02F 2101/30; C02F 2101/38; A01G 20/00; A01G 31/00; A01G 29/00

USPC ........ 210/602, 605, 607, 630, 259, 903, 908
See application file for complete search history.

(56) References Cited

U.S. PATENT DOCUMENTS

| | | | | |
|---|---|---|---|---|
| 4,793,929 A | * | 12/1988 | Kickuth | C02F 3/30 210/903 |
| 6,200,469 B1 | * | 3/2001 | Wallace | C02F 3/00 210/903 |

(Continued)

FOREIGN PATENT DOCUMENTS

CN 109502750 A * 3/2019

OTHER PUBLICATIONS

Machine-generated English translation on CN 109502750, generted on Mar. 10, 2023.*

*Primary Examiner* — Fred Prince

(74) *Attorney, Agent, or Firm* — Renner, Otto, Boisselle & Sklar, LLP

(57) ABSTRACT

A sewage treatment apparatus is provided for reducing nitrogen content in sewage fluid (e.g., after primary treatment). The apparatus uses vegetation to process the sewage fluid and reduce ammonia and organic nitrogen in the processed sewage fluid by uptake of the ammonia and organic nitrogen into the vegetation and by converting the residual ammonia and organic nitrogen into nitrites and nitrates. The apparatus also uses a feedback loop to combine the processed sewage fluid and the raw sewage fluid, such that nitrites and nitrates in the processed sewage fluid are reduced by interacting with carbonaceous waste in the raw sewage fluid.

21 Claims, 8 Drawing Sheets

(56) References Cited

U.S. PATENT DOCUMENTS

| | | | |
|---|---|---|---|
| 7,128,839 B1* | 10/2006 | Flowers | C02F 3/301 210/903 |
| 2016/0176733 A1* | 6/2016 | Calka | C02F 3/327 210/93 |
| 2022/0340463 A1* | 10/2022 | Lawrence | C02F 3/302 |

* cited by examiner

110

Receive into a mixing chamber unprocessed sewage fluid and processed sewage fluid 114

↓

Generate combined sewage fluid by combining the unprocessed sewage fluid with the processed sewage 116

↓

Receive the combined sewage fluid into a reducing container 118

↓

Oxygenate the combined sewage fluid within the reducing container 120

↓

Generate processed sewage fluid from the combined sewage fluid 122

↓

Fluidly connect in a loop the mixing chamber and the reducing container 124

↓

Receive the combined sewage fluid in a polishing chamber including the vegetation 126

↓

Generate polished sewage fluid by maintaining the combined sewage fluid in contact with the vegetation in the polishing chamber 128

*FIG. 8*

PHYTOREMEDIATION TREATMENT METHOD USING VETIVER GRASS TO REMOVE AMMONIA FROM RAW SANITARY WASTEWATER

TECHNICAL FIELD

The present disclosure relates generally to systems and methods for the treatment of water and in particular to the treatment of sewage.

BACKGROUND

Domestic sanitary septic tanks are designed to remove 50-80% of certain types of pollutants. However, the majority of nutrients (e.g., nitrogen, phosphorus, and potassium) pass through in a soluble form. Further, domestic sanitary septic tanks are not designed to remove high levels of ammonia and organic nitrogen. Conventional methods used for treatment of contaminated water, namely chemical, physical, and microbiological methods, are costly to install and operate. Removing high levels of ammonia and organic nitrogen convention*, having been converted to nitrites and nitrates would require more detention time and careful operation to achieve complete de-nitrification.

The combination of the nutrients nitrogen, phosphorus, and potassium are the root cause of the algae blooms in receiving waters. An accepted average concentration of ammonia in raw domestic waste water is 45 mg/L of $NH_3$—N this amount can reach up to 100 mg/L depending upon its source, With typical home usage of 250 gallons of water per day, one septic tank discharges enough nutrients each month to cause an algae bloom in an equivalent size of 1.5 Olympic swimming pools. The level of ammonia needed in water to trigger an algae bloom is approximately 0.3 mg/L of N. Conversely, one pound of dry ammonia is enough to cause an algae bloom in 400,000 gallons of water.

There is not currently an economical and effective process for reducing total nitrogen in selvage fluid discharged from septic tanks.

SUMMARY

A new green technology has been developed, called phytoremediation, which utilizes plants to decontaminate soil, water and air environment.

The present disclosure provides a sewage treatment apparatus for reducing nitrogen content in raw sewage fluid (e.g., from the output of the septic tank, or post primary treatment) using (1) vegetation to process the sewage fluid by reducing ammonia and organic nitrogen in the processed sewage fluid, and (2) implementing a feedback loop to combine the processed sewage fluid and the raw sewage fluid, such that nitrites and nitrates in the processed sewage fluid are reduced (e.g., removed) by interacting with carbonaceous waste in the raw sewage fluid.

While a number of features are described herein with respect to embodiments of the invention; features described with respect to a given embodiment also may be employed in connection with other embodiments. The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention in which similar reference numerals are used to indicate the same or similar parts in the various views.

FIG. 8 is a flow diagram of an embodiment of a method for using vegetation for reducing nitrogen content in sewage fluid having an initial level of ammonia, organic nitrogen, and carbonaceous waste.

Figure 1:
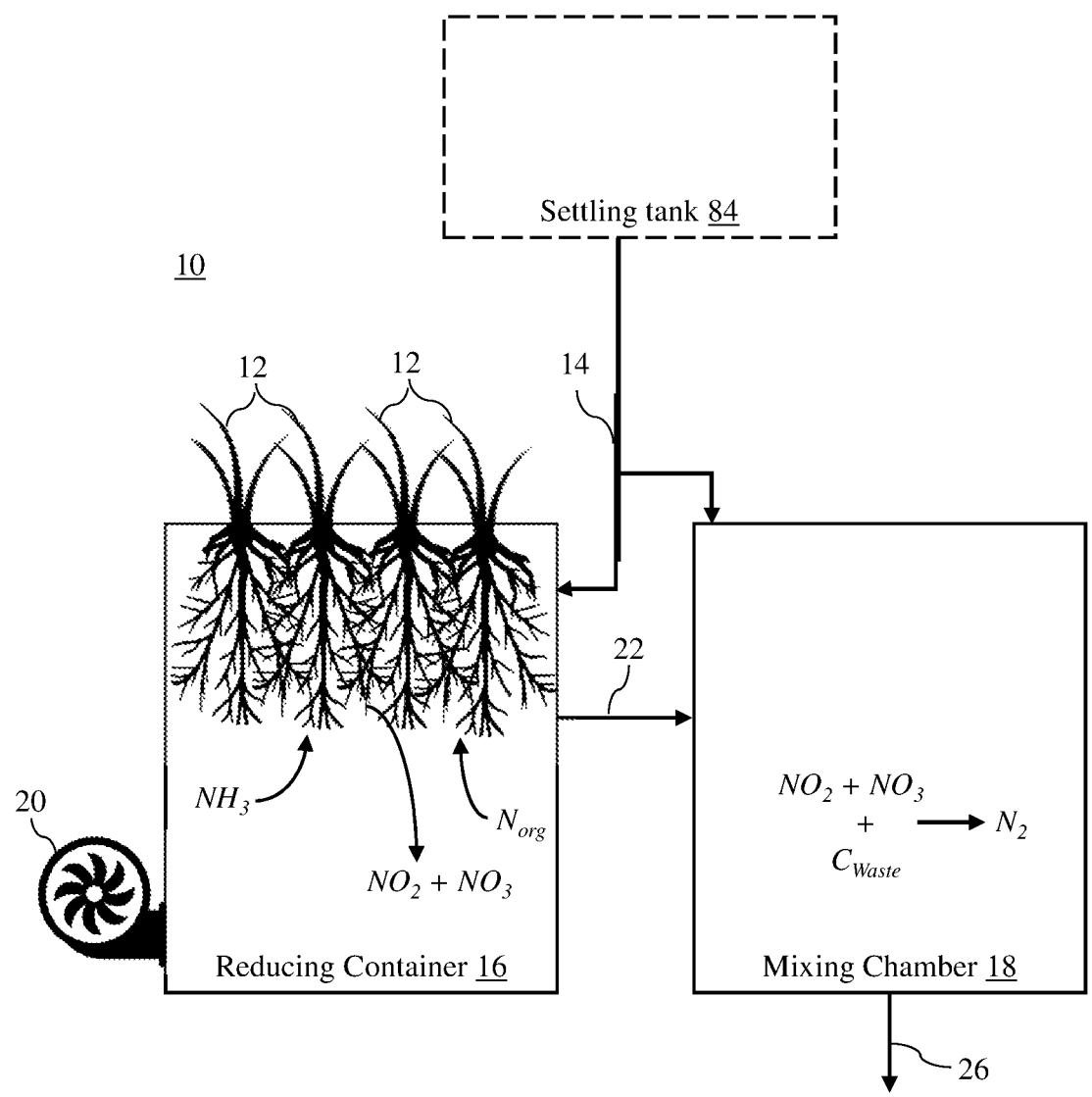
FIG. 1 is a schematic diagram of an embodiment of a sewage treatment apparatus including a reducing container and a mixing chamber.

The present invention is described below in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

DETAILED DESCRIPTION

According to a general embodiment, a sewage treatment apparatus is provided for reducing nitrogen content in raw sewage fluid. The apparatus uses vegetation to process the sewage fluid and reduce ammonia and organic nitrogen in the processed sewage fluid by uptake of the ammonia and organic nitrogen into the vegetation and by converting the residual ammonia and organic nitrogen into nitrites and nitrates. The apparatus also uses a feedback loop to combine the processed sewage fluid and the raw sewage fluid, such that nitrites and nitrates in the processed sewage fluid are reduced by interacting with carbonaceous waste (also referred to as a carbon source) in the raw sewage fluid.

Turning to FIG. 1, an exemplary embodiment is shown of a sewage treatment apparatus 10 using vegetation 12 for reducing nitrogen content in sewage fluid having an initial level of ammonia, organic nitrogen, and carbonaceous waste. The apparatus 10 includes a reducing container 16 (also referred to as a nutrient absorption container), a mixing chamber 18, and an aerator 20. Both the reducing container 16 and the mixing chamber 18 receive unprocessed sewage fluid 14 (also referred to as input sewage fluid) having an initial level of ammonia and organic nitrogen. The reducing container 16 generates processed sewage fluid 22 by maintaining the unprocessed sewage fluid 14 in contact with the vegetation 12. The vegetation 12 generates the processed sewage fluid 22 by reducing the level of ammonia and organic nitrogen in the unprocessed sewage fluid 14 (1) by absorbing a portion of the ammonia and organic nitrogen from the unprocessed sewage fluid 14 and (2) by converting another portion of the ammonia and organic nitrogen in the input sewage fluid into nitrites ($NO_2$) and nitrates ($NO_3$). In addition to receiving the unprocessed sewage fluid 14, the mixing chamber 18 also receives the unprocessed sewage fluid 14. The mixing chamber 18 combines the unprocessed sewage fluid 14 with the processed sewage 22 from the reducing container 16, such that the nitrites and nitrates in the processed sewage 22 interact with the carbonaceous waste in the unprocessed sewage fluid 14 to produce nitrogen ($N_2$) gas and to generate combined sewage fluid 26 (also referred to as denitrogenated processed sewage).

Figure 2:
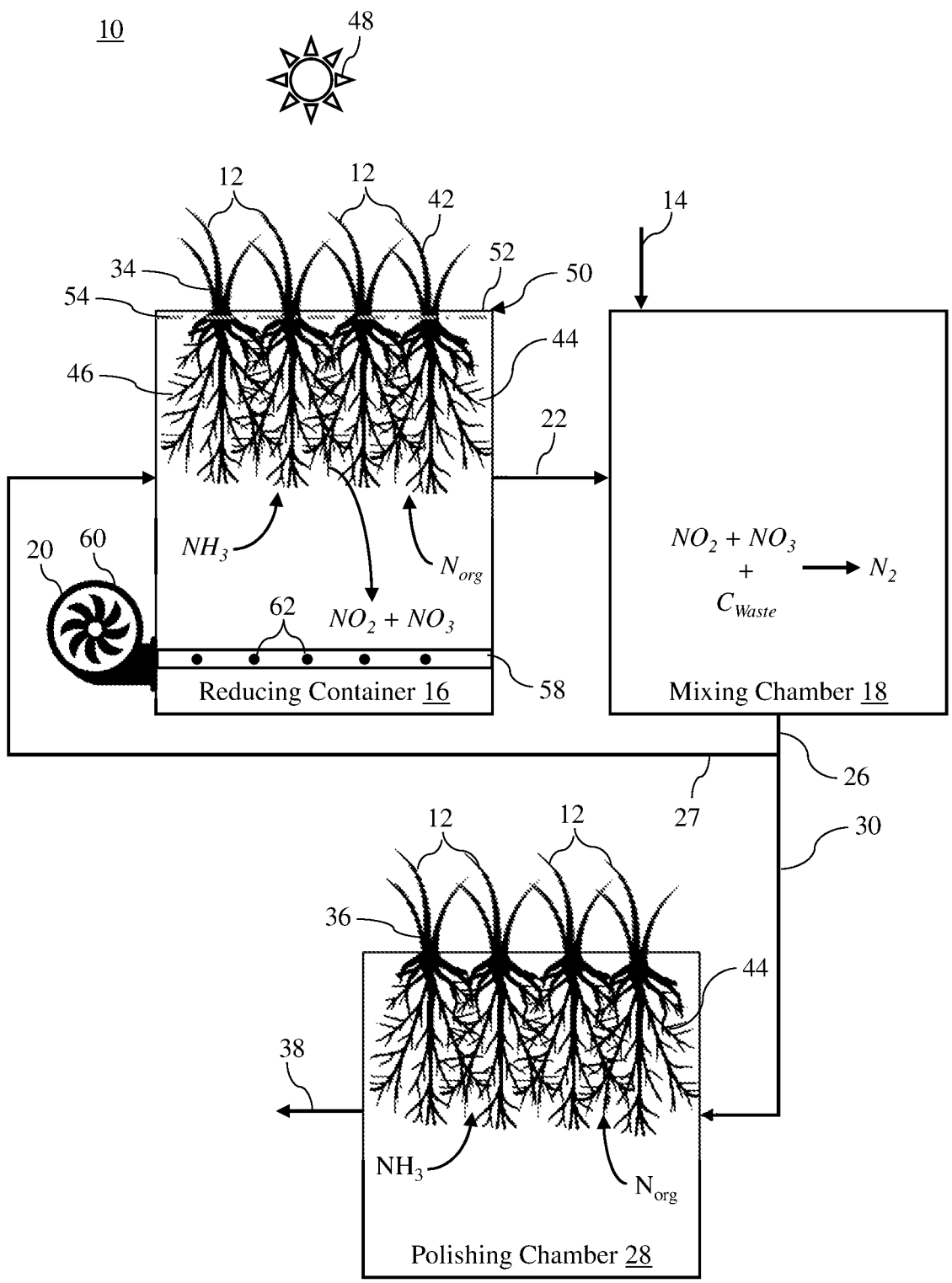
FIG. 2 is a schematic diagram of an embodiment of a sewage treatment apparatus including a reducing container, a mixing chamber, and a polishing chamber.

In the embodiment depicted in FIG. 2, an exemplary embodiment is shown of a sewage treatment apparatus 10 including a reducing container 16, a mixing chamber 18, an aerator 20, and a polishing chamber 28. The mixing chamber 18 receives unprocessed sewage fluid 14 and processed sewage fluid 22. The mixing chamber 18 generates combined sewage fluid 26 (also referred to as denitrogenated processed sewage) by combining the unprocessed sewage fluid 14 with the processed sewage 22, such that the nitrites and nitrates in the processed sewage 22 interact with the carbonaceous waste in the unprocessed sewage fluid 14 to produce nitrogen ($N_2$) gas.

The reducing container 16 receives the combined sewage fluid 26 having an initial level of ammonia and organic nitrogen. The reducing container 16 generates processed sewage fluid 22 by maintaining the combined sewage fluid 26 in contact with the vegetation 12. The vegetation 12 generates the processed sewage fluid 22 by reducing the level of ammonia and organic nitrogen in the combined sewage fluid 26 (1) by absorbing a portion of the ammonia and organic nitrogen from the combined sewage fluid 26 and (2) by converting another portion of the ammonia and organic nitrogen in the input sewage fluid into nitrites ($NO_2$) and nitrates ($NO_3$).

The polishing chamber 28 receives the combined sewage fluid 26 from the mixing chamber 18. As shown in FIG. 2, the mixing chamber and the reducing container may be fluidly connected in a loop, such that (1) a first portion 27 of the combined sewage fluid 26 flows from the mixing chamber 18 into the reducing container 16 and a second portion 30 of the combined sewage fluid 26 flows from the mixing chamber 18 into the polishing chamber 28. That is, the loop is formed by the processed sewage fluid 22 flowing from the reducing container 16 into the mixing chamber 18 and a portion of the combined sewage fluid 26 flowing from the mixing chamber 18 into the reducing container 16.

In the embodiment shown in FIG. 2, the vegetation 12 includes primary vegetation 34 associated with the reducing container 16 and secondary vegetation 36 associated with the polishing chamber 28. The polishing chamber 28 receives the combined sewage fluid 26 and generates polished sewage fluid 38 by maintaining the combined sewage fluid 26 in contact with the secondary vegetation 36. The vegetation 12 generates the polished sewage fluid 38 by reducing the level of ammonia and organic nitrogen in the intake sewage fluid by absorbing a portion of the ammonia and organic nitrogen from the intake sewage fluid.

The vegetation 12 may include any suitable plant for reducing ammonia and organic nitrogen from the sewage fluid 14. For example, the vegetation 12 may include vetiver grass (e.g., such as *Chrysopogon zizanioides*). In one embodiment, the vegetation 12 includes plants 42 (e.g., vetiver grass) having microbes 44 located along roots 46 of the plants 42. The microbes 44 may convert the residual ammonia into nitrite and nitrate.

The vegetation 12 may include any number of plants covering any suitable area. For example, the vegetation 12 may cover a majority (e.g., at least 75% or at least 90%) of a surface area of the reducing container 16 and the polishing chamber 28. For example, roots of the vegetation may extend to at least 75% of a depth of the reducing tank 16.

In one embodiment, the reducing container 16 maintains the vegetation 12 in contact with the combined sewage fluid 26 and exposes the vegetation 12 to sunlight 48. For example, the reducing container 16 may be part of a hydroponic system 50. The reducing container 16 may include an open top 52 and a support structure 54. The vegetation 12 may be supported by the support structure 54 such that at least a portion of the vegetation 12 (e.g., the roots 46) is in contact with the sewage fluid 14. In one embodiment, the vegetation 12 is supported by the support structure 54 to form a deep-water hydroponic treatment culture.

The vegetation 12 may be supported in any suitable means such that the roots of the vegetation 12 interact with the sewage fluid. For example, the support structure 54 may include a basket and a basket support structure. The basket may house the vegetation 12, such that roots 46 of the vegetation 12 are at least partially located outside of the basket. The basket support structure may support the basket relative to the sewage fluid 14 of the reducing container 16, such that the roots 46 of the vegetation 12 contact the sewage fluid 14 of the reducing container 16.

As described above, the sewage treatment apparatus 10 includes an aerator 20. The aerator 20 supplies oxygen to roots 46 of the vegetation 12 by oxygenating the combined sewage fluid 26 within the reducing container 16. The aerator 20 may include any suitable device for dissolving oxygen in the sewage fluid 14. In the embodiment shown in FIG. 2, the aerator 20 includes air channels 58 and a blower 60 (e.g., a regenerative blower) configured to drive air through the air channels 58. The air channels 58 may be located within the reducing container 16 and may include bubble openings 62, such that the air driven through the air channels 58 passes through the bubble openings 62 and oxygenates the combined sewage fluid 26 located within the reducing container 16.

The aerator 20 may receive power using any suitable electrical connection and source of electric power. For example, the aerator 20 may receive power from the electrical grid, solar panels, etc.

The aerator 20 may be controlled to modulate the amount of dissolved oxygen in the sewage fluid 14 within the reducing container 16. For example, the 20 aerator may maintain dissolved oxygen of the sewage fluid 14 at approximately 4 mg/L (e.g., at least 4 mg/L, 4-6 mg/L, at least 3.5 mg/L, etc.), such that uptake of the ammonia and organic nitrogen from the combined sewage fluid 26 by the roots 46 of the vegetation 12 is enabled.

Figure 3:
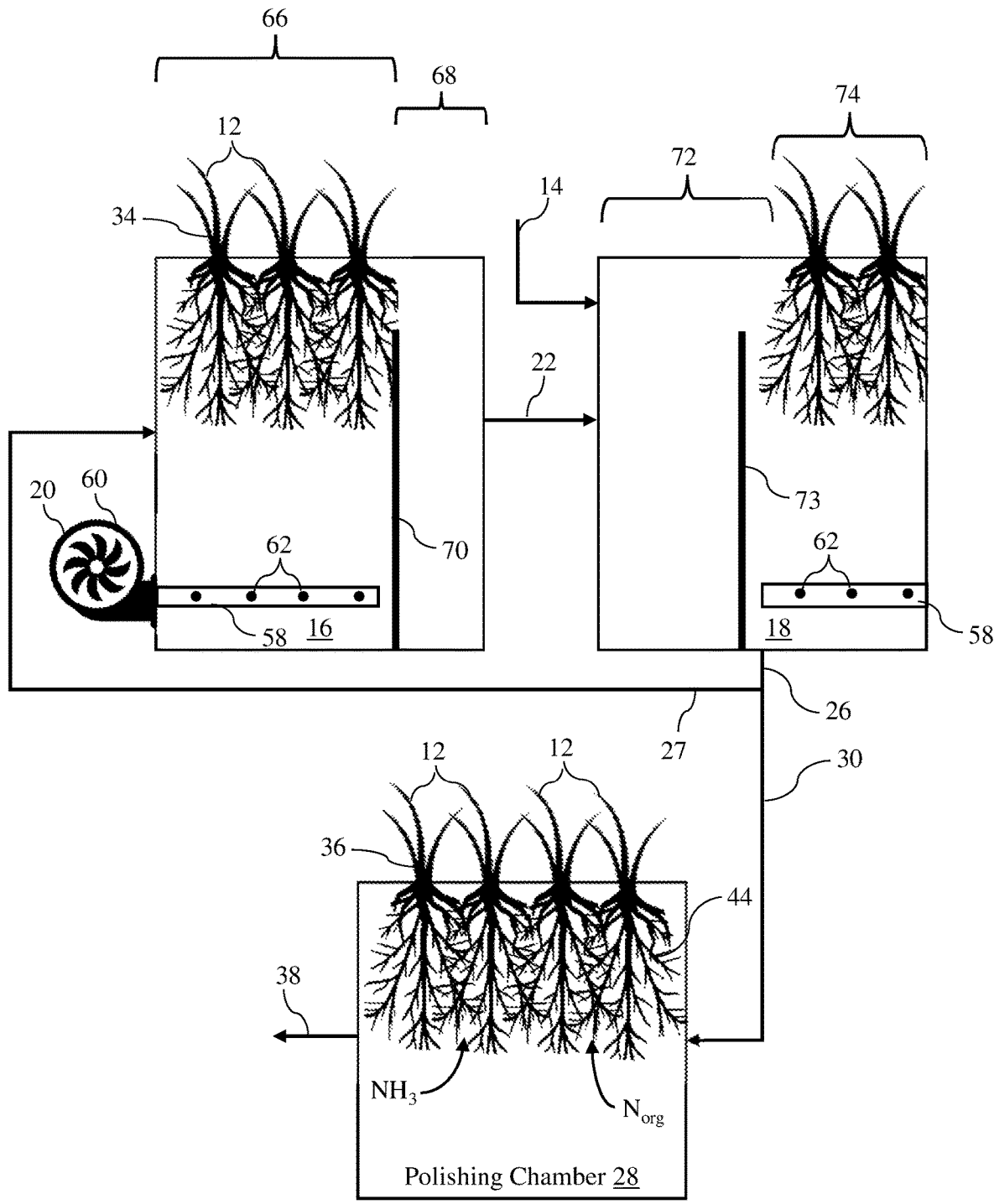
FIG. 3 is a schematic diagram of an embodiment of a sewage treatment apparatus including a reducing container and a mixing chamber having aerobic and anaerobic zones.

In the embodiment show in FIG. 3, the reducing container 16 includes an aerobic zone 66 and an anaerobic zone 68. For example, the aerator 20 may not dissolve oxygen into the sewage fluid 14 of the anaerobic zone 68. Instead, the aerator 20 may only dissolve oxygen into the sewage fluid 14 of the aerobic zone 68. For example, the aerobic zone 66 and the anaerobic zones 68 of the reducing container 16 may be fluidly coupled with a baffle 70 partially dividing the aerobic zone 66 from the anaerobic zone 68. In one embodiment, the mixing chamber 18 may be anoxic. For example, the aerator 20 may not oxygenate the processed sewage 22 within the mixing chamber 18. By not aerating the anaerobic zone 68, the oxygen levels in the mixing chamber 18 may be reduced further than if the entirety of the reducing container 16 was aerated. That is, the anaerobic zone 66 may be positioned such that the processed sewage 22 in the mixing chamber 18 is received from the anaerobic zone 68 of the reducing container 16, such that an amount of soluble oxygen in the mixing chamber 18 is reduced.

In one embodiment, the mixing chamber 18 includes an anaerobic zone 72 and an aerobic zone 74. For example, the aerobic zone 72 and the aerobic zone 74 may be separated by a baffle 73. The aerobic zone 74 of the mixing chamber 18 may be fluidly coupled to the anaerobic 72 zone of the mixing chamber 18. The anaerobic zone 72 may be positioned within the mixing chamber 18, such that the combination of the unprocessed sewage fluid 14 and the processed sewage fluid 22 is first received in the anaerobic zone 72. The anaerobic zone 72 may be configured such that the nitrites and nitrates of the processed sewage fluid 22 are reduced by the interaction with the carbonaceous waste of the unprocessed sewage fluid 14. The aerobic zone 74 may be configured such that the ammonia and organic nitrogen of the unprocessed sewage fluid 14 is reduced by contact with the vegetation 12. The combination of the unprocessed sewage fluid 14 and the processed sewage fluid 22 in the aerobic zone 74 of the mixing chamber 18 may be oxygenated by the aerator 20. A detention time of the anaerobic zone 72 of the mixing chamber may be 10 hours or more.

Figure 4:
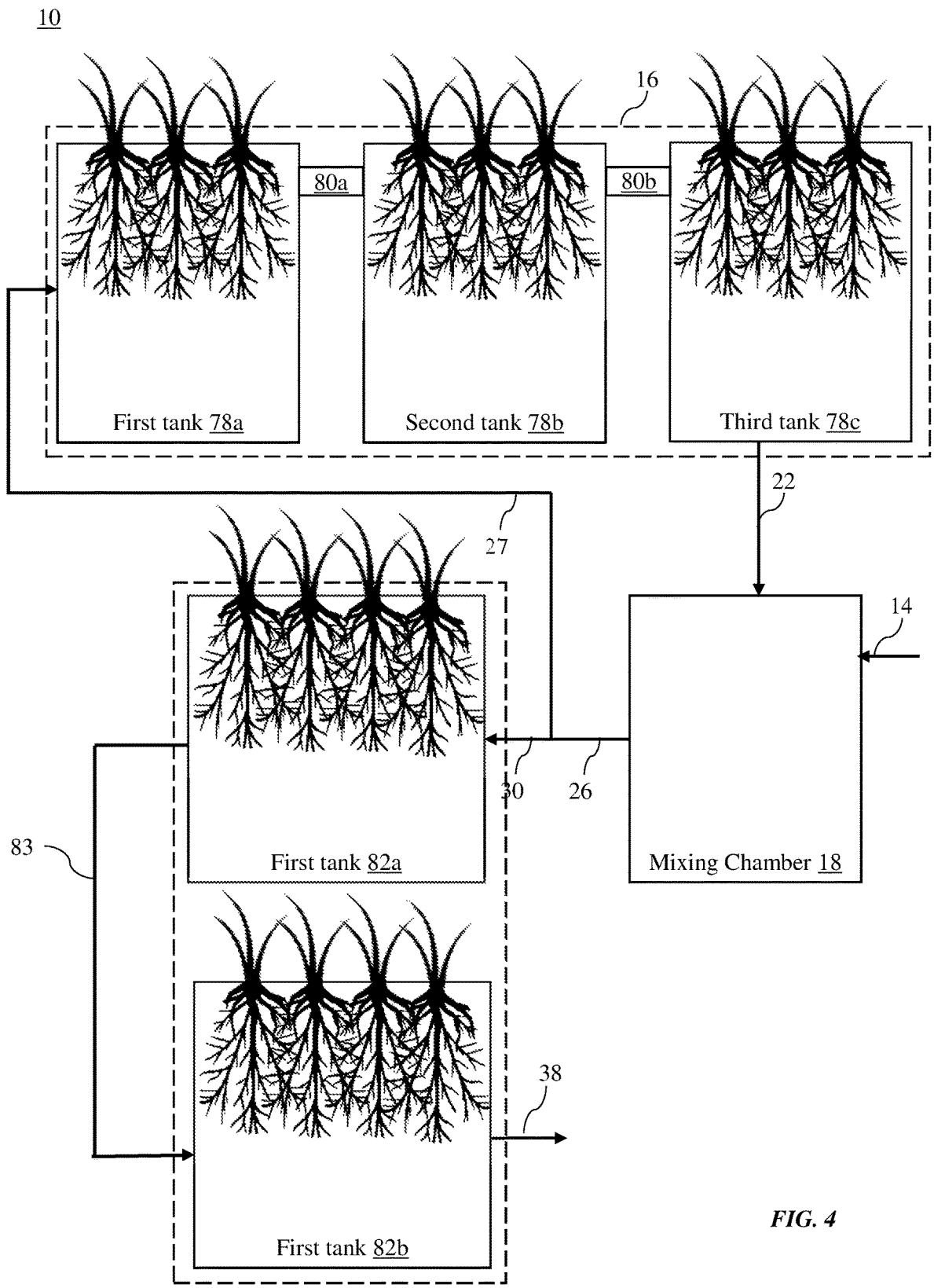
FIG. 4 is a schematic diagram of an embodiment of a sewage treatment apparatus including a reducing container having multiple tanks.

In the embodiment shown in FIG. 4, the reducing container 16 includes multiple tanks 78 fluidly coupled by a pipe 80. For example, the multiple tanks 78 may include a first tank 78a fluidly coupled to a second tank 78b, such that fluid within the first tank 78a flows through the pipe 80a into the second tank 78b. In another example, the multiple tanks 78 may also include a third tank 78c fluidly coupled to the second tank 78b, such that fluid within the second tank flows 78b through the pipe 80b into the third tank 78c.

As shown, the polishing chamber 28 may also include multiple tanks 82 fluidly coupled via a pipe 83. For example, the multiple tanks 82 may include a first tank 82a fluidly coupled to a second tank 82b, such that fluid within the first tank 82a flows through the pipe 83 into the second tank 82b. The polishing chamber 28 may include a same or different number of tanks compared to the reducing container 16.

In one embodiment, the sewage fluid 14 may include raw effluent received from an output of a settling tank 84. For example, the sewage fluid 14 may include raw domestic post-septic tank sanitary wastewater. The sewage treatment apparatus 10 may receive and process any type of fluid. For example, the sewage fluid 14 may include wastewater or other fluids such as municipal, domestic or septage liquid sanitary waste material, food waste, commercial farm animal waste, landfill leachate and the like.

The sewage treatment apparatus 10 is not limited to receiving the combined sewage fluid 26 at a particular flow rate, but may instead receive combined sewage fluid 26 at any suitable flow rate. For example, the flow rate of the combined sewage fluid 26 received by the reducing container may be at least 1,000 gallons per day depending upon tank dimensions and sewage concentration.

The reducing container 16 may be any suitable container for expositing a root system of vegetation to the sewage fluid. For example, the reducing container 16 may be a water tank defining a water-confining space, and adapted to contain a volume of water to be resident for treatment by plant roots, said tank having a top opening, an input conduit (e.g., a pipe) for receiving a flow of sewage fluid to be treated, and an output conduit for discharging a flow of water once treated within the water tank. The reducing container 16 may additionally include a support structure adapted to support a plant having plant roots such that the plant roots distend into contact with the volume of water while resident in the water tank.

The reducing container 16, the mixing chamber 18, and the polishing chamber 28 may be constructed of any suitable material, such as plastic, concrete, metal or any other suitable watertight material. The reducing container 16, the mixing chamber 18, and the polishing chamber 28 may similarly have any size, shape, and dimension.

The reducing container 16, the mixing chamber 18, and the polishing chamber 28 may be fluidly connected using any suitable means (e.g., using pipe(s)) and may include any number of additional tanks, containers, etc. located between the reducing container 16, the mixing chamber 18, and the polishing chamber 28. Fluids may be passed between the reducing container 16, the mixing chamber 18, and the polishing chamber 28 using any suitable means (e.g., pumps located inside and/or outside the different chambers, containers, and tanks).

Figure 5:
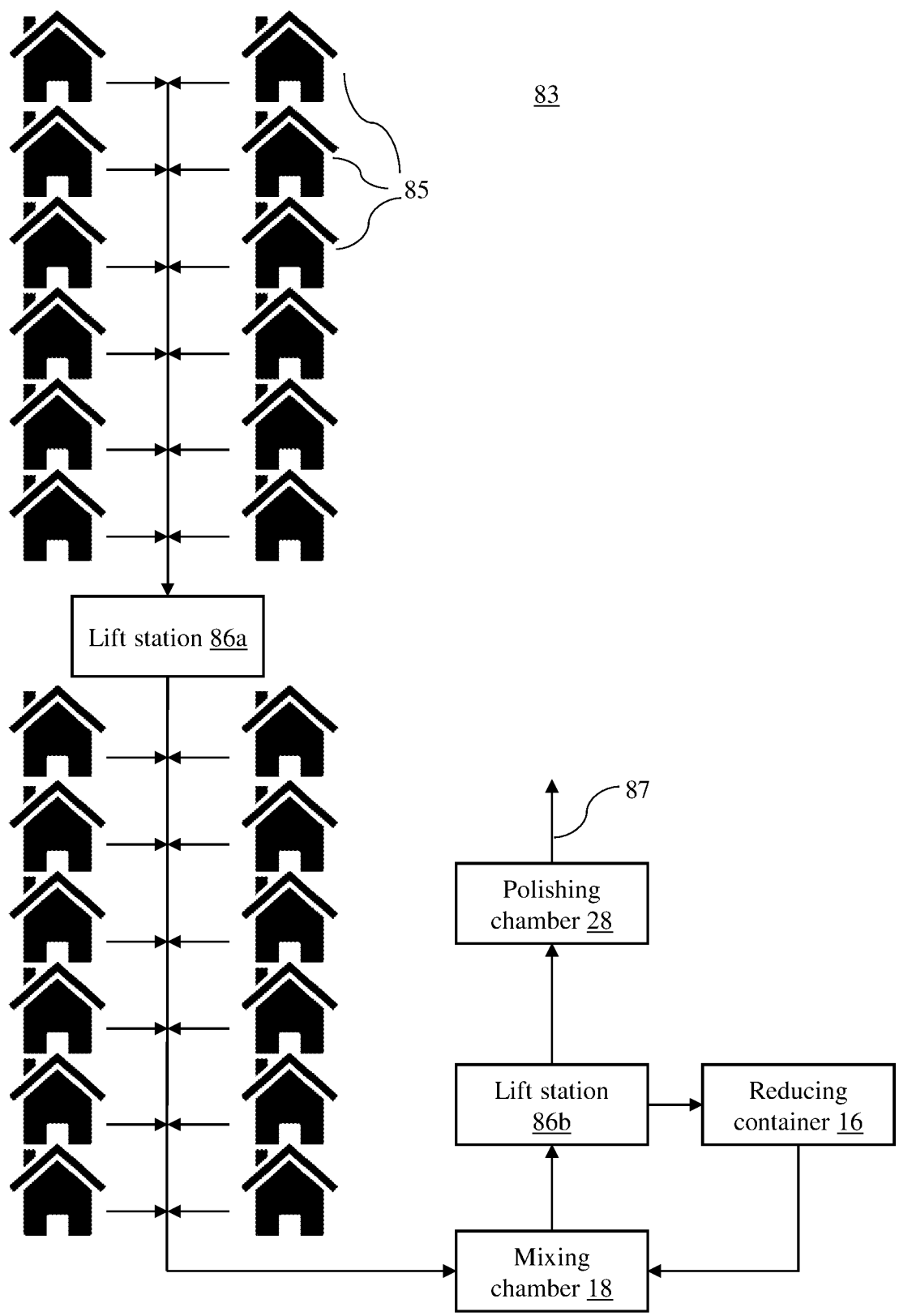
FIG. 5 is a schematic diagram of an embodiment of a wastewater package plant.

In the embodiment shown in FIG. 5, a wastewater package plant 83 for reducing nitrogen content in sewage fluid is shown. The plant 83 includes the sewage treatment apparatus 10 where the sewage fluid is received from a plurality of septic tanks 85. The plant 83 may include an output conduit 87 for passing into a receiving stream or a ground area the processed denitrogenated processed sewage or the polished sewage fluid.

In one embodiment, the output of the septic tanks 85 may flow together through a pipe at a grade (e.g., 2%) to a lift station 86a, where the sewage fluid is then pumped towards the surface before entering another sewage pipe and again traveling downhill at a grade. The sewage fluid 14 may be received by the mixing chamber 18 and the output of the mixing chamber 18 may be split between a reducing container 16 and a polishing chamber 28 by a lift station 86b. The sewage fluid 14 may be received by the mixing chamber 18 and pass from the mixing chamber 18 to a lifting station 86h. The lifting station 86b may pass the denitrogenated processed sewage fluid 26 to the reducing container 16 and the polishing chamber 28. The reducing chamber 16 may pass the processed sewage 22 back to the mixing chamber 18. The polished sewage fluid 38 may pass from the polishing chamber 28 to the output conduit 87.

Figure 6:
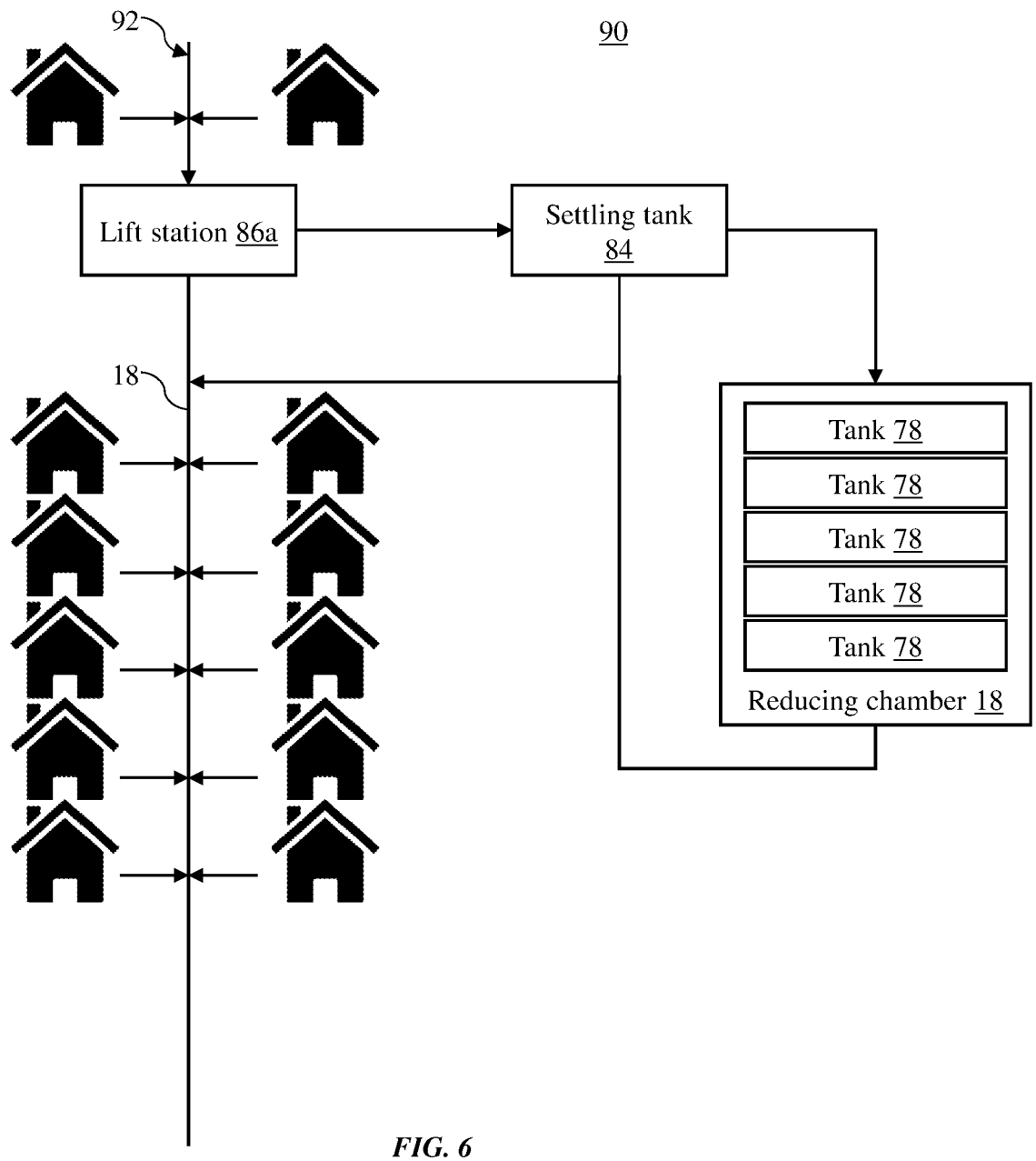
FIG. 6 is a schematic diagram of an embodiment of a modified (e.g., municipal sewer) collection system for reducing nitrogen content in sewage fluid of a sewage collection system.

In the embodiment shown in FIG. 6, a modified collection system 90 for reducing nitrogen content in sewage fluid of a sewage collection system 92 (e.g., pretreating sewage fluid before the sewage fluid is received by a municipal wastewater treatment plant) is shown. The modified collection system 90 includes the sewage treatment apparatus 10. In the modified collection system 90, the reducing container 18 receives as the combined sewage fluid 26 the sewage fluid from the sewage collection system 92. As shown, the mixing chamber 18 may be a conduit (e.g., a pipe) of the sewage collection system 92. This next statement is not quite correct. FIG. 6 shows a Vetiver field . . . to treat ~10% of a large WWTP. For example, the modified collection system 90 may be used to treat sewage fluid before the sewage fluid has left a building. In one embodiment, the reducing container 16 may be located along an exterior of a building. For example, the processed sewage 22 exiting the reducing chamber 16 (e.g., one of the tanks 78 of the reducing chamber 16) may mix with the unprocessed sewage fluid 14 from the settling tank 84 in a sewage pipe.

Figure 7:
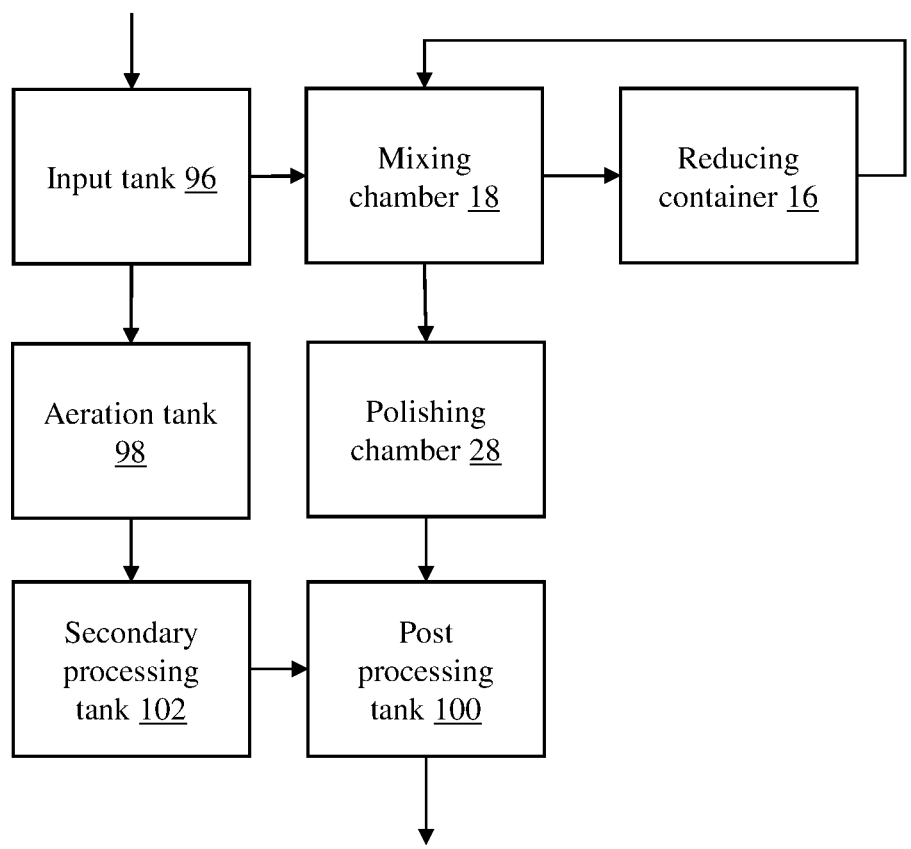
FIG. 7 is a schematic diagram of an embodiment of a retrofitted sewer treatment facility including the sewage treatment apparatus.

In the embodiment shown in FIG. 7, a retrofitted sewer treatment facility 94 including the sewage treatment apparatus 10 is shown. The retrofitted sewer treatment facility 94 includes an input tank 96. The input tank 96 may include multiple tanks. For example, the input tank 96 may include a series of aeration tanks. A first aeration tank may include pumps (e.g., centrifugal pumps) for directing the input sewage fluid to different aeration tanks. As shown in FIG. 7, the input tank 96 passes the unprocessed sewage fluid 14 to the mixing chamber 18 and an aeration tank 98. In the mixing chamber 18, the unprocessed sewage fluid 14 is combined with processed sewage 22 from the reducing container 16 to generate combined sewage fluid 26. The mixing chamber 18 passes the denitrogenated processed sewage fluid 26 to the reducing container 16 and to the polishing chamber 28. The polishing chamber 28 generates polished sewage fluid 38 and outputs the polished sewage fluid 38 to a post processing tank 100.

The post processing tank 100 may receive input processed sewage fluid from the polishing chamber 28 and a secondary processing tank 102. The secondary processing tank 102 receives sewage fluid from the aeration tank 98. The secondary processing tank 102 may include multiple different types of tanks. For example, the secondary processing tank 102 may include multiple aeration tanks, one or more settling tanks, a digester, etc. The post processing tank 100 may be a chlorine tank. The post processing tank 100 may output processed sewage fluid to filter beds.

In the embodiment shown in FIG. 8, a method 110 of using vegetation for reducing nitrogen content in sewage fluid having an initial level of ammonia, organic nitrogen, and carbonaceous waste. In step 114, unprocessed sewage fluid 14 and processed sewage fluid 26 is receiving into the mixing chamber 26. In step 116, combined sewage fluid 26 is generated by combining in the mixing chamber the unprocessed sewage fluid 14 with the processed sewage 22, such that the nitrites and nitrates in the processed sewage 22 interact with the carbonaceous waste in the unprocessed sewage fluid 14 to produce nitrogen ($N_2$) gas.

In step 118, the combined sewage fluid 26 is received into a reducing container 16 including the vegetation 12. In step 120, oxygen is supplied to roots of the vegetation 12 by oxygenating the combined sewage fluid 26 within the reducing container 16. In step 122, processed sewage fluid 22 is generated from the combined sewage fluid 26. As described above, the processed sewage fluid 22 is generated by maintaining the combined sewage fluid 26 in contact with the vegetation 12 and by reducing the level of ammonia and organic nitrogen in the combined sewage fluid 26. The level of ammonia and organic nitrogen in the combined sewage fluid 26 is reduced (1) by absorbing a portion of the ammonia and organic nitrogen from the combined sewage fluid 26 into the vegetation 12, and (2) by converting another portion of the ammonia and organic nitrogen in the combined sewage fluid 26 into nitrites ($NO_2$) and nitrates ($NO_3$) using the vegetation 12.

In step 124, the mixing chamber 18 and the reducing container 16 are fluidly connecting in a loop. In this loop, the processed sewage fluid 22 flows from the reducing container 16 into the mixing chamber 18, Also, a first portion 27 of the combined sewage fluid 26 flows from the mixing chamber 18 into the reducing container 16. A second portion 30 of the combined sewage fluid 26 flows from the mixing chamber 18 into the polishing chamber 28.

In step 126, the combined sewage fluid 26 is received in the polishing chamber 28 including the vegetation 12. In step 128, polished sewage fluid 38 is generated by maintaining the combined sewage fluid 26 in contact with the vegetation 12 in the polishing chamber 28, such that the level of ammonia and organic nitrogen in the intake sewage fluid is reduced by a portion of the ammonia and organic nitrogen from the intake sewage fluid being absorbed by the vegetation 12.

All ranges and ratio limits disclosed in the specification and claims may be combined in any manner. Unless specifically stated otherwise, references to "a," "an," and/or "the" may include one or more than one, and that reference to an item in the singular may also include the item in the plural.

Although the invention has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A sewage treatment apparatus using vegetation for reducing nitrogen content in sewage fluid having an initial level of ammonia, organic nitrogen, and carbonaceous waste, the apparatus comprising:
  a reducing container configured to receive input sewage fluid and to generate processed sewage fluid by maintaining the input sewage fluid in contact with the vegetation, wherein:
    the input sewage fluid has an initial level of ammonia and organic nitrogen; and
    the vegetation is configured to generate the processed sewage fluid by reducing the level of ammonia and organic nitrogen in the input sewage fluid by absorbing a portion of the ammonia and organic nitrogen from the input sewage fluid, and by converting another portion of the ammonia and organic nitrogen in the input sewage fluid into nitrites ($NO_2$) and nitrates ($NO_3$);
  an aerator configured to supply oxygen to roots of the vegetation by oxygenating the input sewage fluid within the reducing container; and
  a mixing chamber configured to:
    receive the sewage fluid as unprocessed sewage fluid; and
    combine the unprocessed sewage fluid with the processed sewage, such that the nitrites and nitrates in the processed sewage interact with the carbonaceous waste in the unprocessed sewage fluid to produce nitrogen ($N_2$) gas and to generate denitrogenated processed sewage.

2. A sewage treatment apparatus using vegetation for reducing nitrogen content in sewage fluid having an initial level of ammonia, organic nitrogen, and carbonaceous waste, the apparatus comprising:

a mixing chamber configured to:
 receive unprocessed sewage fluid and processed sewage fluid, wherein the unprocessed sewage fluid has an initial level of ammonia and organic nitrogen; and
 generate and output combined sewage fluid by combining the unprocessed sewage fluid with the processed sewage, such that nitrites and nitrates in the processed sewage are reduced by interacting with the carbonaceous waste in the unprocessed sewage fluid to produce nitrogen ($N_2$) gas;

a reducing container configured to receive the combined sewage fluid and to generate the processed sewage fluid by maintaining the combined sewage fluid in contact with the vegetation, wherein:
 the combined sewage fluid has an initial level of ammonia and organic nitrogen; and
 the vegetation is configured to generate the processed sewage fluid by reducing the level of ammonia and organic nitrogen in the combined sewage fluid by absorbing a portion of the ammonia and organic nitrogen from the combined sewage fluid, and by converting another portion of the ammonia and organic nitrogen in the combined sewage fluid into the nitrites ($NO_2$) and nitrates ($NO_3$) in the processed sewage fluid; and an aerator configured to supply oxygen to roots of the vegetation by oxygenating the combined sewage fluid within the reducing container;

a polishing chamber, wherein the mixing chamber and the reducing container are fluidly connected in a loop such that:
 the processed sewage fluid flows from the reducing container into the mixing chamber;
 a first portion of the combined sewage fluid flows from the mixing chamber into the reducing container; and
 a second portion of the combined sewage fluid flows from the mixing chamber into the polishing chamber;
the vegetation includes primary vegetation associated with the reducing container, and secondary vegetation associated with the polishing chamber;
the polishing chamber is configured to receive the combined sewage fluid and to generate polished sewage fluid by maintaining the combined sewage fluid in contact with the secondary vegetation, wherein the vegetation is configured to generate the polished sewage fluid by reducing the level of ammonia and organic nitrogen in the combined sewage fluid by absorbing a portion of the ammonia and organic nitrogen from the combined sewage fluid.

3. The apparatus of claim 2, wherein the vegetation includes plants having microbes located along roots of the plants that are configured to convert the ammonia into nitrite and nitrate.

4. The apparatus of claim 2, wherein the vegetation includes vetiver grass.

5. The apparatus of claim 2, wherein the reducing container is configured to maintain the vegetation in contact with the combined sewage fluid and to expose the vegetation to sunlight.

6. The apparatus of claim 2, further comprising a hydroponic system, wherein:
the reducing container is part of the hydroponic system;
the reducing container includes an open top and a support structure;
the vegetation is supported by the support structure such that at least a portion of the vegetation is in contact with the combined sewage fluid.

7. The apparatus of claim 2, wherein:
the aerator includes air channels and a blower configured to drive air through the air channels; and
the air channels are located within the reducing container and include bubble openings, such that the air driven through the air channels passes through the bubble openings and oxygenates the combined sewage fluid located within the reducing container.

8. The apparatus of claim 2, wherein the aerator is configured to maintain dissolved oxygen of the combined sewage fluid at at least 4 mg/L, such that uptake of the ammonia and organic nitrogen from the combined sewage fluid by roots of the vegetation is enabled.

9. The apparatus of claim 2, wherein:
the reducing container includes an aerobic zone and an anaerobic zone; and
the aerator does not dissolve oxygen into the combined sewage fluid of the anaerobic zone.

10. The apparatus of claim 9, wherein the aerobic zone and the anaerobic zones of the reducing container are fluidly coupled, and a baffle partially divides the aerobic zone from the anaerobic zone.

11. The apparatus of claim 10, wherein the anaerobic zone is positioned such that the processed sewage received by the mixing chamber is received from the anaerobic zone of the reducing container, such that an amount of soluble oxygen in the mixing chamber is reduced.

12. The apparatus of claim 2, wherein:
the mixing chamber includes an anaerobic zone and an aerobic zone;
the aerobic zone of the mixing chamber is fluidly coupled to the anaerobic zone of the mixing chamber;
the anaerobic zone is positioned within the mixing chamber, such that the combination of the unprocessed sewage fluid and the processed sewage fluid is first received in the anaerobic zone;
the anaerobic zone is configured such that the nitrites and nitrates of the processed sewage fluid are reduced by the interaction with the carbonaceous waste of the unprocessed sewage fluid;
the aerobic zone is configured such that the ammonia and organic nitrogen of the unprocessed sewage fluid is reduced by contact with the vegetation; and
the combination of the unprocessed sewage fluid and the processed sewage fluid in the aerobic zone of the mixing chamber is oxygenated by the aerator.

13. The apparatus of claim 12, wherein a detention time of the anaerobic zone of the mixing chamber is at least 10 hours.

14. The apparatus of claim 2, wherein the reducing container includes multiple tanks fluidly coupled by a pipe.

15. The apparatus of claim 14, wherein the multiple tanks include a first tank fluidly coupled to a second tank, such that fluid within the first tank flows through the pipe into the second tank.

16. The apparatus of claim 2, wherein the mixing chamber is anoxic.

17. The apparatus of claim 2, wherein the sewage fluid comprises raw effluent received from an output of a settling tank.

18. A wastewater package plant for reducing nitrogen content in sewage fluid, the plant comprising:
the apparatus of claim 2, wherein the sewage fluid is received from a plurality of septic tanks.

19. The package plant of claim 18, further comprising an output conduit configured to pass into a receiving stream or a ground area at least one of the processed denitrogenated processed sewage or the polished sewage fluid.

20. A modified collection system for reducing nitrogen content in sewage fluid of a sewage collection system, the modified collection system comprising the apparatus of claim 2, wherein:
the reducing container receives as the combined sewage fluid the sewage fluid from the sewage collection system; and
the mixing chamber is a conduit of the sewage collection system.

21. A method of using vegetation for reducing nitrogen content in sewage fluid having an initial level of ammonia, organic nitrogen, and carbonaceous waste, the method comprising:
receiving into a mixing chamber unprocessed sewage fluid and processed sewage fluid, wherein the unprocessed sewage fluid has an initial level of ammonia and organic nitrogen;
generating combined sewage fluid by combining in the mixing chamber the unprocessed sewage fluid with the processed sewage, such that nitrites and nitrates in the processed sewage interact with the carbonaceous waste in the unprocessed sewage fluid to produce nitrogen ($N_2$) gas;
receiving the combined sewage fluid into a reducing container including the vegetation;
supplying oxygen to roots of the vegetation by oxygenating the combined sewage fluid within the reducing container; and
generating the processed sewage fluid from the combined sewage fluid by:
maintaining the combined sewage fluid in contact with the vegetation, wherein the combined sewage fluid has an initial level of ammonia and organic nitrogen; and
reducing the level of ammonia and organic nitrogen in the combined sewage fluid by absorbing a portion of the ammonia and organic nitrogen from the combined sewage fluid into the vegetation, and by converting another portion of the ammonia and organic nitrogen in the combined sewage fluid into the nitrites ($NO_2$) and nitrates ($NO_3$) in the processed sewage fluid using the vegetation;
fluidly connecting in a loop the mixing chamber and the reducing container such that:
the processed sewage fluid flows from the reducing container into the mixing chamber;
a first portion of the combined sewage fluid flows from the mixing chamber into the reducing container as the input sewage fluid; and
a second portion of the combined sewage fluid flows from the mixing chamber into a polishing chamber;
receiving the combined sewage fluid in the polishing chamber including the vegetation; and
generating polished sewage fluid by maintaining the combined sewage fluid in contact with the vegetation in the polishing chamber, such that the level of ammonia and organic nitrogen in the combined sewage fluid is reduced by a portion of the ammonia and organic nitrogen from the combined sewage fluid being absorbed by the vegetation.

\* \* \* \* \*